United States Patent [19]
Woods et al.

[11] Patent Number: 6,012,185
[45] Date of Patent: Jan. 11, 2000

[54] BLOCKS FOR ELEVATING BED LEGS

[75] Inventors: Larry A. Woods, Youngstown; Myron E. Ullman, Jr., Canfield, both of Ohio

[73] Assignee: Rest Right, Inc., Youngstown, Ohio

[21] Appl. No.: 09/158,977

[22] Filed: Sep. 10, 1998

[51] Int. Cl.[7] ............................. F16M 11/24; A47C 31/00
[52] U.S. Cl. ............................. 5/509.1; 5/11; 248/188.2; 446/117
[58] Field of Search .................... 5/509.1, 11, 310; 248/188.2; 446/117, 124, 69

[56] References Cited

U.S. PATENT DOCUMENTS

| | | | |
|---|---|---|---|
| 314,831 | 3/1885 | Hardy | 108/144 |
| D. 404,992 | 2/1999 | Sittig | D8/374 |
| 575,806 | 1/1897 | Garvey | 248/188.2 |
| 1,635,183 | 7/1927 | Jeannotte | 248/188.2 |
| 1,670,601 | 5/1928 | Weaver | 5/509 |
| 1,933,602 | 11/1933 | Scherer | 155/42 |
| 2,072,791 | 3/1937 | Baer | 248/161 |
| 2,278,894 | 4/1942 | Paulson | 446/117 |
| 2,366,867 | 1/1945 | Nichthauser | 45/137 |
| 2,496,758 | 2/1950 | Tingley | 47/41 |
| 2,830,303 | 4/1958 | Sandock | 5/63 |
| 2,893,164 | 7/1959 | Martin | 45/137 |
| 2,933,850 | 4/1960 | Martin | 45/139 |
| 2,935,813 | 5/1960 | Berman et al. | 45/139 |
| 3,110,039 | 11/1963 | Barnett | 4/159 |
| 3,227,112 | 1/1966 | Wiseman | 108/144 |
| 3,247,528 | 4/1966 | Swenson et al. | 5/62 |
| 3,259,921 | 7/1966 | Alsobrook, Jr. | 5/62 |
| 3,310,289 | 3/1967 | Burke | 254/126 |
| 3,586,306 | 6/1971 | Reece et al. | 267/3 |
| 3,795,925 | 3/1974 | Leagus, Jr. | 248/161 |
| 4,046,348 | 9/1977 | Goodwin | 248/423 |
| 4,117,999 | 10/1978 | Gessler | 248/188.2 |
| 4,312,088 | 1/1982 | Webb | 5/509 |
| 4,505,457 | 3/1985 | Okada et al. | 267/3 |
| 4,549,767 | 10/1985 | Hampshire et al. | 297/439 |
| 4,624,341 | 11/1986 | Lee | 182/15 |
| 4,678,234 | 7/1987 | Wilson | 297/439 |
| 4,776,548 | 10/1988 | Bezenek | 248/188.2 |
| 4,830,320 | 5/1989 | Bellows | 248/188.2 |
| 4,919,386 | 4/1990 | Cassina | 248/544 |
| 5,037,084 | 8/1991 | Flor | 272/70 |
| 5,050,861 | 9/1991 | Thomas et al. | 272/70 |
| 5,060,896 | 10/1991 | Hobbins | 248/188.2 |
| 5,096,186 | 3/1992 | Wilkinson et al. | 272/70 |
| 5,118,095 | 6/1992 | Flor | 482/52 |
| 5,158,512 | 10/1992 | Irwin et al. | 482/52 |
| 5,176,596 | 1/1993 | Ullman | 482/52 |
| 5,199,122 | 4/1993 | Styblo | 5/509.1 |
| 5,205,097 | 4/1993 | Harvey | 248/188.2 X |
| 5,213,554 | 5/1993 | Goldstein et al. | 482/52 |
| 5,224,227 | 7/1993 | McGinley | 5/509.1 |
| 5,345,631 | 9/1994 | Saperstein et al. | 5/509.1 |
| 5,354,247 | 10/1994 | Wilkinson | 482/52 |
| 5,591,105 | 1/1997 | Dalebout et al. | 482/52 |
| 5,599,258 | 2/1997 | Stone et al. | 482/52 |
| 5,615,429 | 4/1997 | Williams | 5/509.1 |
| 5,638,913 | 6/1997 | Blum | 182/33 |
| 5,647,286 | 7/1997 | Dunn | 248/188.2 X |

Primary Examiner—Brian K. Green
Assistant Examiner—Rodrigo J. Morales
Attorney, Agent, or Firm—David A. Burge

[57] ABSTRACT

A pair of stackable, nestable blocks for elevating the leg of a bed to a plurality of selectable heights employs first and second blocks that each have upper and lower ends, with recesses being provided in at least one of the ends of each block that can be oriented upwardly to receive and support the foot or lower end region of a bed leg. Each block has a different length, which enables each block, used separately, to support the bed leg at a different height. Recesses of differing depths preferably are provided in opposite ends of at least one of the blocks, whereby the block or blocks that have dual-depth recesses can be inverted to provide bed leg support at two different heights. One of the two blocks preferably has a larger size than the other and is provided with recess(es) large enough to receive and support one or both of the end regions of the other of the blocks, whereby the smaller-size block can be stacked and nested atop the larger-size block to provide still more bed leg elevation heights. Five heights may be provided utilizing two blocks of different length and size if only one of the blocks is provided with different depth recesses. Additional bed leg elevation heights may be provided if both blocks have different depth recesses in their opposite ends.

20 Claims, 9 Drawing Sheets

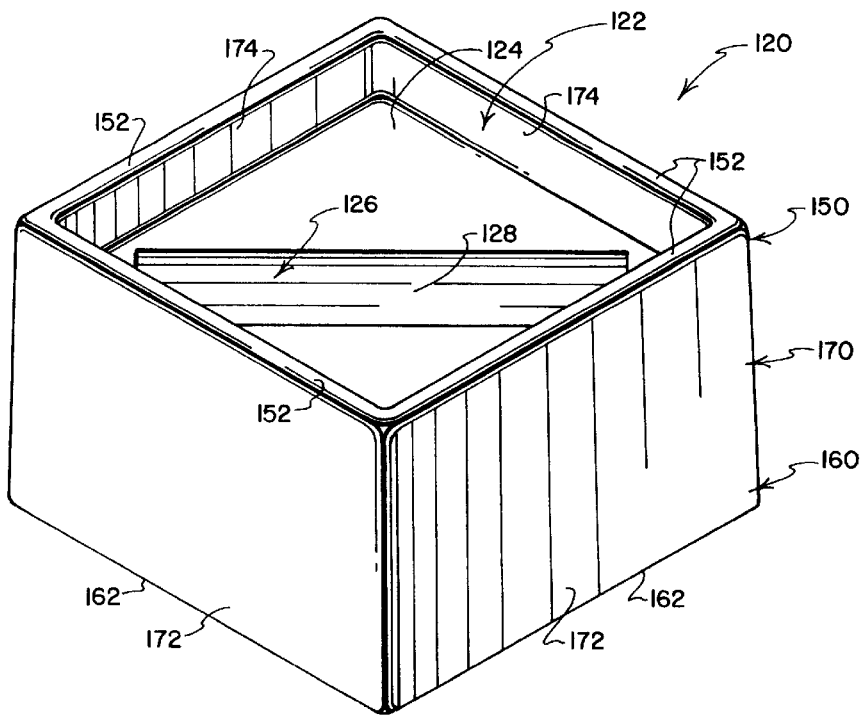
FIG. 2
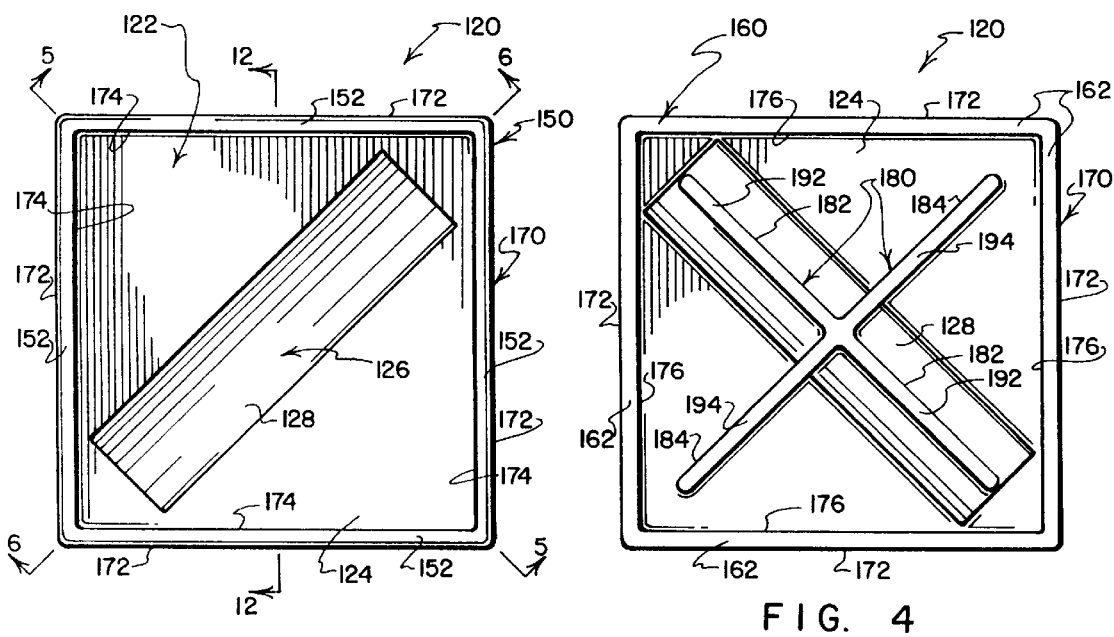
FIG. 3
FIG. 4

BLOCKS FOR ELEVATING BED LEGS

BACKGROUND OF THE INVENTION

1. Field of the Invention

The present invention relates generally to pairs of blocks for supporting bed legs for raising one end of a bed for therapeutic or other purposes. More particularly, the present invention relates to a pair of stackable, nestable blocks that may be employed singly or in stacked combination to support a bed leg at a plurality of selectable heights.

2. Prior Art

Many people suffer from physical ailments which are relieved or treated by resting or sleeping in a head-elevated or foot-elevated bed. Raising the foot end of a bed may assist those who have such physical conditions as phlebitis or varicose veins. Raising the head end of a bed may assist those who have such physical conditions as hiatal hernias as well as other gastronomical, cardiac and respiratory ailments.

The extent to which one end or the other of a bed should be elevated to provide optimum relief or treatment differs from one circumstance to another, and may need to be adjusted as circumstances change. To fully accommodate the needs of most patients, a capability to selectively elevate a bed leg at heights within the range of about one inch to about seven inches may prove helpful. However, most needs for bed leg elevation are well served if elevation capabilities within a range of about two inches to about six inches are provided.

In an effort to address this need, a variety of bed leg elevation devices have been proposed, some of which utilize stackable elements. Drawbacks common to many prior proposals have included the need to employ relatively complexly configured bed leg support elements and/or the need to employ a sizable number of stackable elements if bed leg support at three or more heights is to be offered. Some prior proposals require the use of as many as five stackable elements if a capability of supporting a bed leg at five distinct heights is to be offered.

SUMMARY OF THE INVENTION

The present invention addresses the foregoing and other needs and drawbacks of the prior art by providing a pair of bed elevation blocks that can be utilized individually or in stacked relationship to support a bed leg at a variety of distinct heights. The invention offers a capability to support a bed leg at a surprising number of distinct heights by using nothing more than a simple pair of stackable, nestable blocks, either singly or in stacked combination.

A feature of the preferred practice of the invention resides in the very simple configuration of the blocks that are employed—a configuration that permits each of the blocks to be formed as a one-piece member utilizing injection-molded material such as plastics—a configuration that permits one or both of the blocks to be provided with different depth recesses at its opposite ends so that the block or blocks that have different depth recesses may be used in both upright and inverted positions to provide bed leg support at different heights.

One aspect of the present invention resides in the provision of a pair of one-piece blocks that are capable of being positioned atop a floor surface in an upright orientation to independently support a bed leg at different heights, with at least one of the blocks also being capable of supporting the bed leg at another height when positioned atop the floor surface in an inverted orientation, and with the blocks also being capable of supporting the bed leg at still other heights when the blocks are stacked one atop the other. Preferably the stacked blocks also are capable of supporting the bed leg at different heights depending on how the blocks are oriented, with different bed leg elevation heights being provided depending on whether the blocks are stacked with both in upright orientations, or with one or both of the stacked blocks inverted.

In accordance with the preferred practice of the present invention, each of the blocks has an upper end region and an opposed end region. Recesses are defined by each of the upper end regions and by at least one of the opposed end regions. The opposed end region recess(es) differ in depth from the upper end region recesses. All of these recesses are of sufficient size to permit the bottom end region of a conventional bed leg to be received and supported therein when the recesses are oriented to face upwardly. By this arrangement, the blocks each can be used independently in an upright orientation to support the bed leg at different heights, and the block or blocks that have dual-depth recesses can be inverted to provide other bed leg support height(s). One of the two blocks preferably has a larger size than the other and is provided with recess(es) that are large enough to receive and support one or both of the end regions of the other of the blocks, whereby the smaller block can be stacked and nested atop the larger block to provide still more bed leg elevation heights.

By utilizing two blocks of different size and length that each have recesses at one end, with one also having a different depth recess at its opposite end, a total of five different elevation heights can be provided if the blocks are employed singly and in stacked combination. As many as eight different elevation heights can be provided by using two blocks singly and in combination if both of the blocks have different depth recesses in their opposite ends.

BRIEF DESCRIPTION OF THE DRAWINGS

Other features and a fuller understanding of the invention may be had by referring to the following description and claims taken in conjunction with the accompanying drawing, wherein:

FIG. 2 is a perspective view of a first of the two the blocks of FIG. 1;

FIG. 3 is a top plan view thereof;

FIG. 4 is a bottom plan view thereof;

DESCRIPTION OF THE PREFERRED EMBODIMENT

Figure 1:
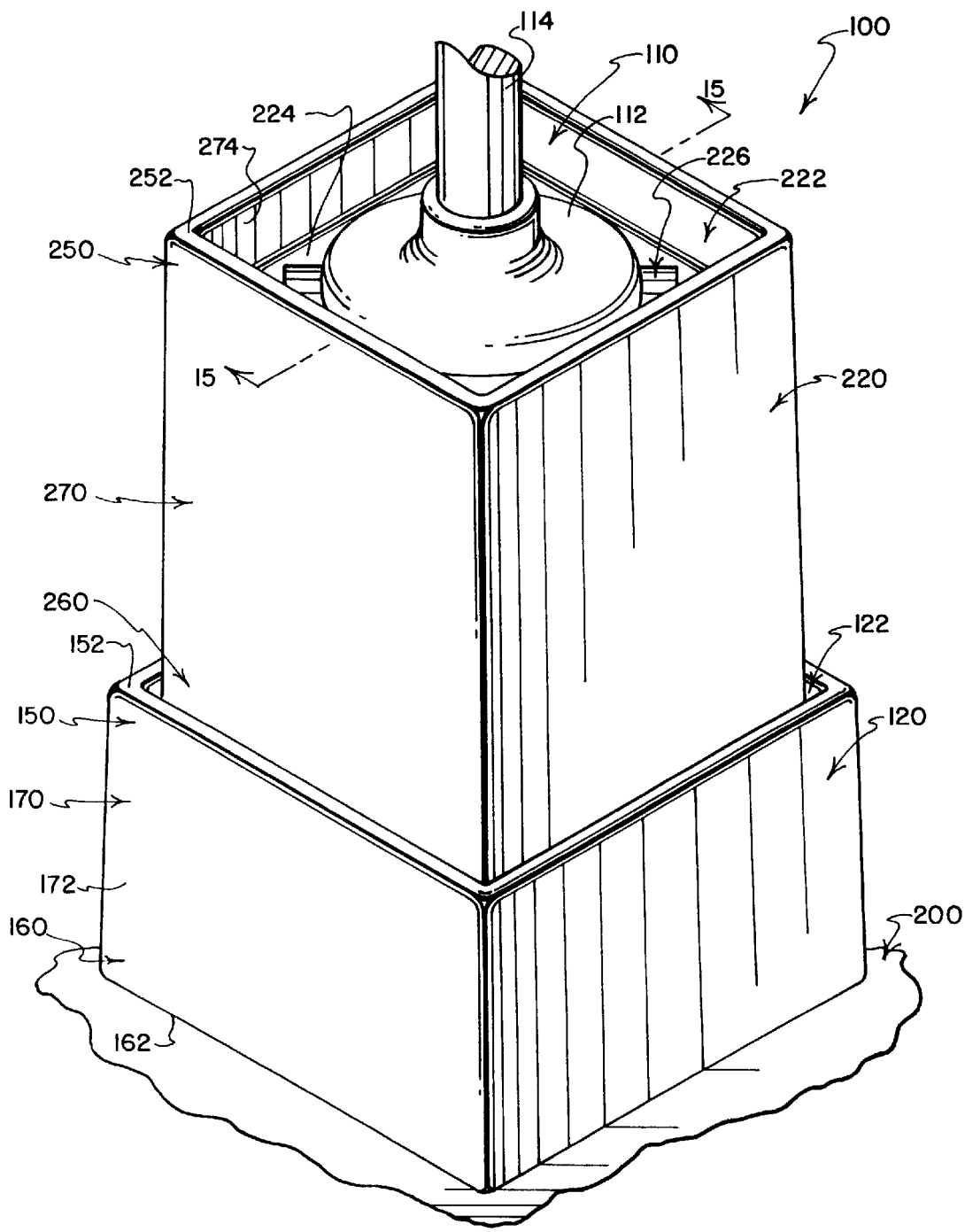
FIG. 1 is a perspective view that depicts a pair of stackable, nestable bed leg support blocks that embody one form of the preferred practice of the present invention, with the blocks shown stacked, nested, and supporting a foot of a bed leg atop a floor surface.

Referring to FIG. 1, a pair of stacked, nested blocks 100 embodying one form of the preferred practice of the present invention is shown supporting the leg 110 of a conventional bed or bed frame (not shown) at one height above a floor surface 200. For purposes of illustrating one of the many types of bed leg configurations that may be supported at a selection of heights by the blocks 110, the bed leg 110 is depicted as having a relatively large diameter foot 112 connected to an upwardly extending stem 114.

The pair of blocks 100 includes a first or lower block 120 that is relatively short and wide, and a second or upper block 220 that is relatively tall and thin. In FIGS. 12–16, five ways are shown of using the blocks 120, 220 either singly or in stacked combination to support the bed leg 110 at different heights above the floor surface 200.

Figure 12:
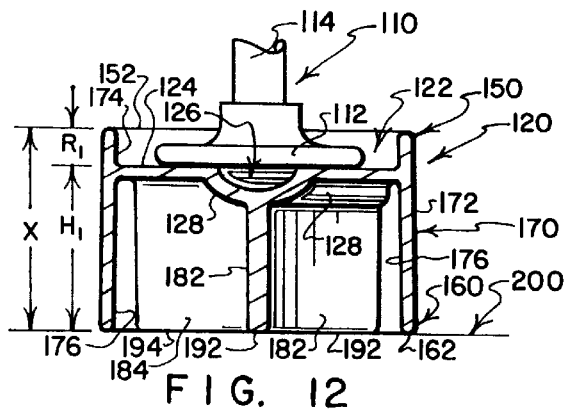
FIG. 12 is a sectional view as seen from a plane indicated by a line 12—12 in FIG. 3, showing the first block supporting the foot of a bed leg at one height atop a floor surface.
Figure 15:
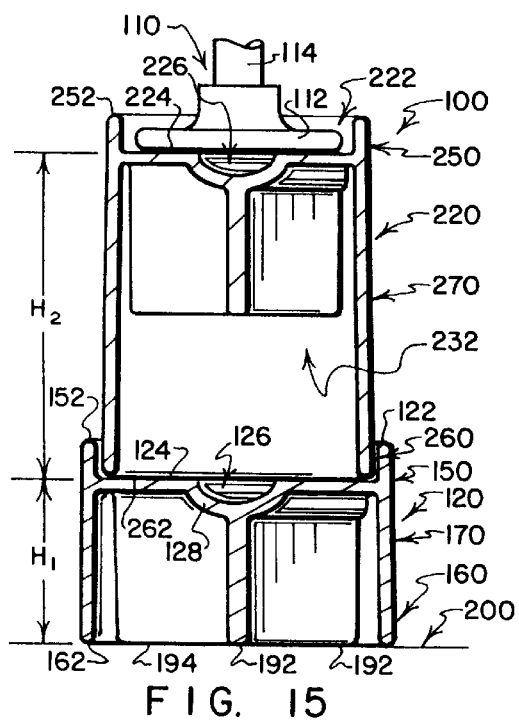
FIG. 15 is a sectional view as seen from a plane indicated by a line 15—15 in FIG. 1 showing the stacked blocks supporting the bed leg at another height above the floor surface.
Figure 16:
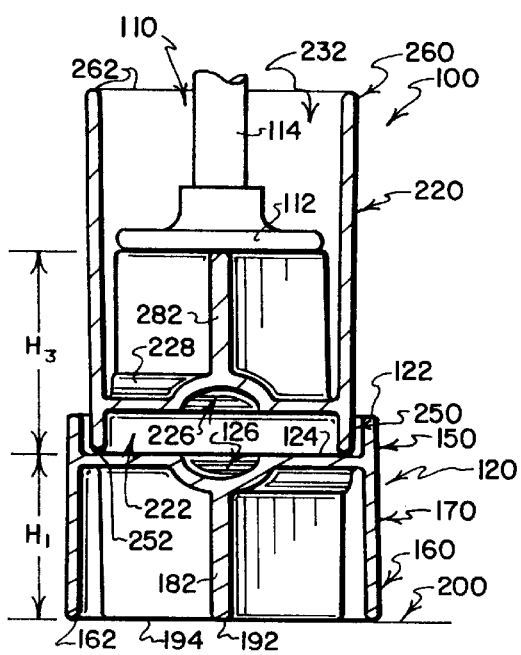
FIG. 16 is a sectional view similar to FIG. 15 but showing the second block in an inverted orientation stacked and nested atop the first block and supporting the bed leg at still another height above the floor surface.

An upright position (or upright orientation) of the first block 120 is depicted in FIGS. 1, 2, 5, 6, 12, 15 and 16. When upright, the upper end region 124 of the first block 120 defines a relatively shallow, upwardly facing recess 122. The recess 122 is of sufficient size to permit either an upper end region 250 or an opposite end region 260 of the second block 220 to be received, nested and supported therein as is depicted in FIGS. 15 and 16, respectively. Alternatively, the recess 122 may receive the foot 112 therein to enable the first block 120 to function, by itself, in supporting the bed leg 110 at a first height above the floor surface 200, as shown in FIG. 12.

Figure 13:
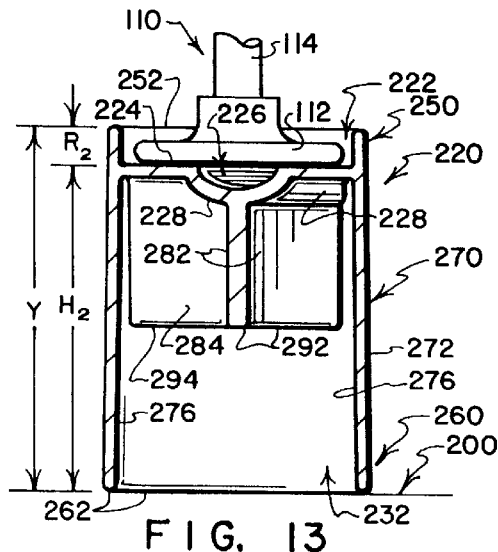
FIG. 13 is a sectional view as seen from a plane indicated by a line 13—13 in FIG. 8, showing the second block in one orientation supporting the bed leg at another height above the floor surface.
Figure 14:
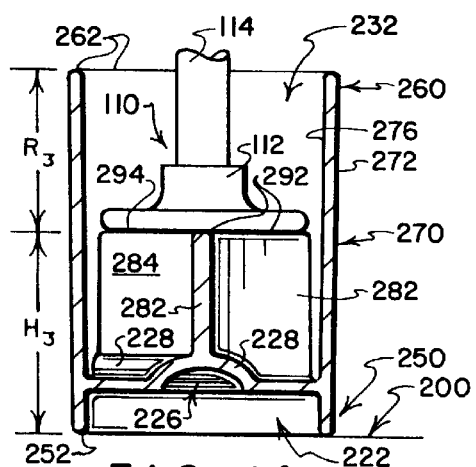
FIG. 14 is a sectional view similar to FIG. 13 but showing the second block in an inverted orientation supporting the bed leg at yet another height above the floor surface.

An upright position (or upright orientation) of the second block 220 is depicted in FIGS. 1, 7, 10, 11, 13 and 15. When upright, the upper end region 224 of the second block 220 defines a relatively shallow, upwardly facing recess 222. An inverted position (or inverted orientation) of the second block 220 is depicted in FIGS. 14 and 16. When inverted, the opposite end region 260 of the second block 220 defines a relatively deep, upwardly facing recess 232. The recesses 222, 232 are of sufficient size to permit the foot 112 of the bed leg 110 to be received and supported therein at second and third heights above the floor surface 200, as depicted in FIGS. 13 and 14, respectively; and at fourth and fifth heights above the floor surface 200 when the second block 220 is stacked and nested atop the first block 120, in upright and inverted positions, as depicted in FIGS. 15 and 16, respectively.

Figure 17:
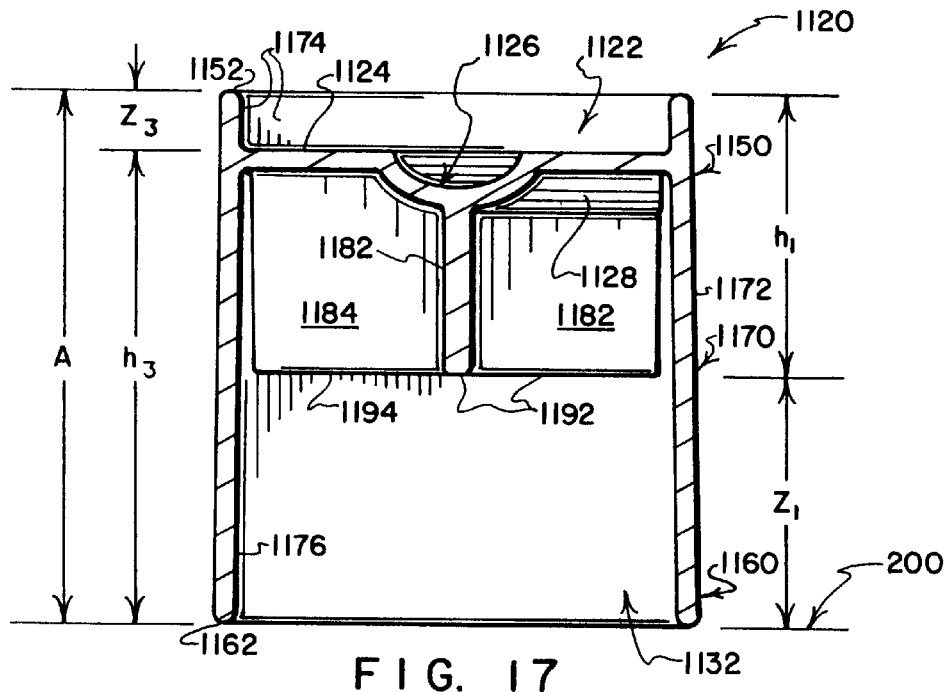
FIG. 17 is a sectional view, similar to FIG. 12 but on an enlarged scale, showing an alternate form of the first block that has different-depth recesses defined in opposite ends thereof.
Figure 18:
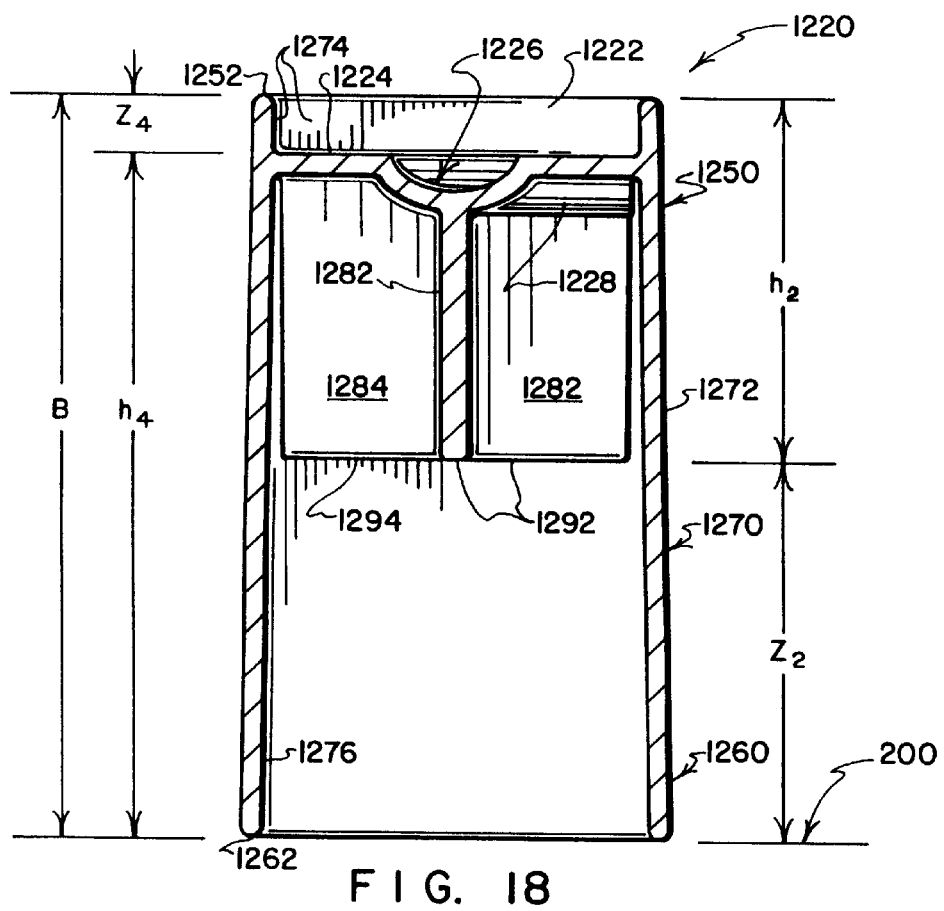
FIG. 18 is a sectional view, similar to FIG. 13 but on an enlarged scale, showing an alternate form of the second block.

A feature that permits the different length, different sized blocks 120, 220 to support the bed leg 110 at as many as five different heights above the floor surface 200 is the provision in opposite end regions of the second block 220 of recesses 222, 232 that are of different depth. If a greater selection of bed leg elevation heights is desired, as many as eight different heights can be provided by utilizing different length, different sized blocks of an alternate form wherein each of the blocks has different depth recesses in its opposite ends—such as the alternate form of first block 1120 that is shown in FIG. 17, and the alternate form of second block 1220 that is shown in FIG. 18. In FIGS. 19–26, a total of eight different ways are illustrated of using the alternate first and second blocks 1120, 1220 to obtain eight different bed leg elevation heights. Features of the alternate blocks 1120, 1220 and other aspects of what is depicted in FIGS. 17–26 will be discussed later herein, after features of the blocks 120, 220 and other aspects of what is shown in FIGS. 1–16 are treated in the paragraphs that follow.

In FIGS. 2–6, features of the first block 120 are shown. Referring to FIG. 2, the first block 120 has an upper end region 150 and an opposite end region 160 that are connected by an upstanding side wall 170. A top surface 152 is defined by the upper end region 150. A bottom surface 162 is defined by the lower end region 160. The upstanding side wall 170 has an exterior surface 172 that extends the full distance between and connects the top and bottom surfaces 152, 162.

Figure 5:
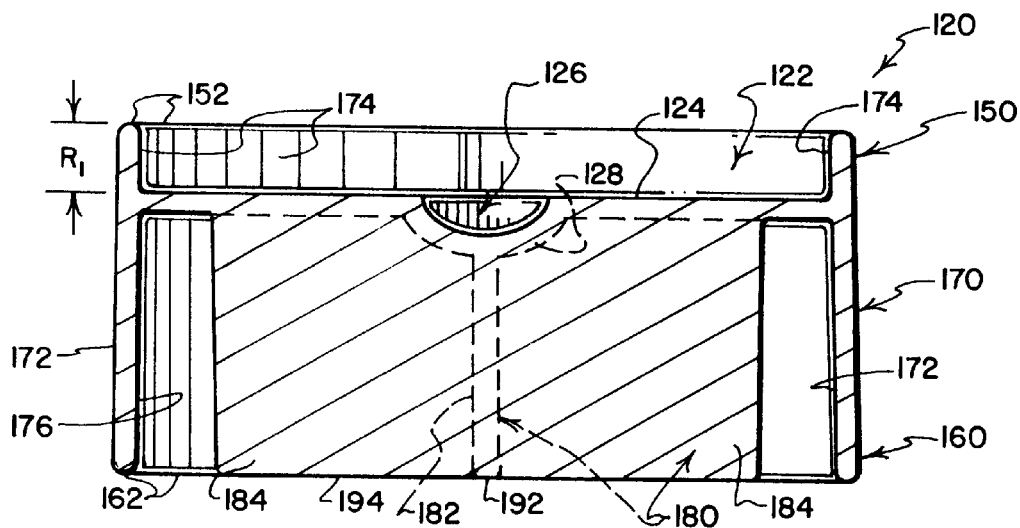
FIGS. 5 and 6 are sectional views as seen from planes indicated by the lines 5—5 and 6—6 in FIG. 3.
Figure 6:
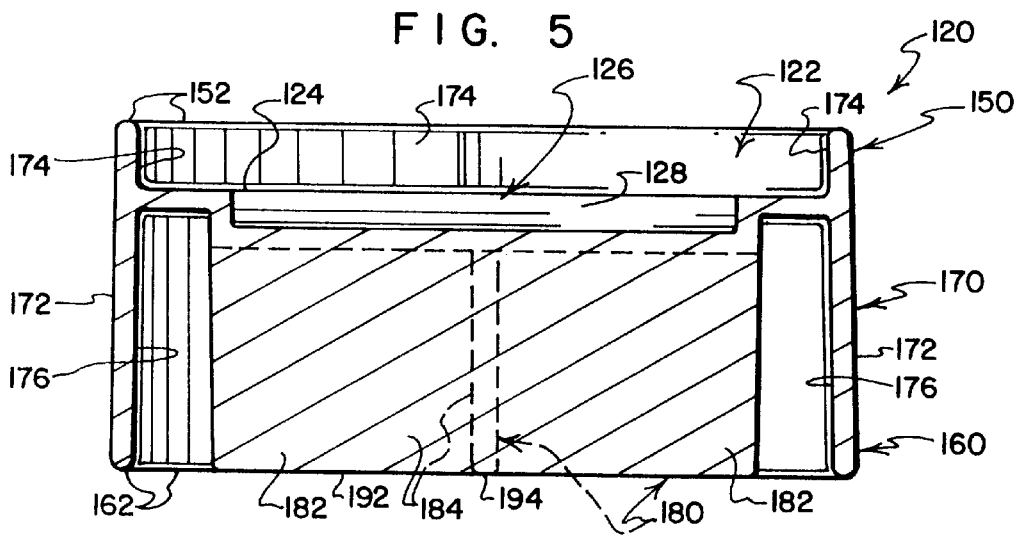

Referring to FIGS. 2, 3, 5 and 6, the recess 122 of the first block 120 is defined by a bottom wall 124 that parallels the planes of the top and bottom surfaces 152, 162, and by an upper interior surface 174 of the upstanding side wall 170. The depth of the recess 122 (as indicated by the dimension $R_1$ in FIGS. 5 and 12) is defined by the distance between the plane of the bottom wall 124 and the plane of the top surface 152. Referring to FIGS. 4–6, a lower interior surface 176 of the upstanding side wall 170 extends from the bottom wall 124 to the bottom surface 162.

To strengthen and reinforce the bottom wall 124, an elongate, curved-bottom depression 126 is provided that opens upwardly into the recess 122, as is best seen in FIGS. 2, 3, 5 and 6. Referring to FIGS. 5 and 6, the depression 126 has a curved bottom wall 128 that depends into a space that is perimetrically surrounded by the lower interior surface 176 of the upstanding side wall 170. Also depending into the space surrounded by the interior surface 176 is a reinforcing rib structure 180 that has ribs 182, 184 that intersect to define an X-shape, as is best seen in FIG. 4. The ribs 182, 184 extend at right angles to each other and intersect mid-way along their lengths. Referring to FIGS. 4–6, upper portions of the rib 182 underlie and join with the bottom wall 128 of the depression 126. Upper portions of the rib 184 underlie and join with portions of the bottom walls 124, 128. Bottom portions of the ribs 182, 184 have bottom surfaces 192, 194 that reside in substantially the same plane as the bottom surface 152.

Figure 7:
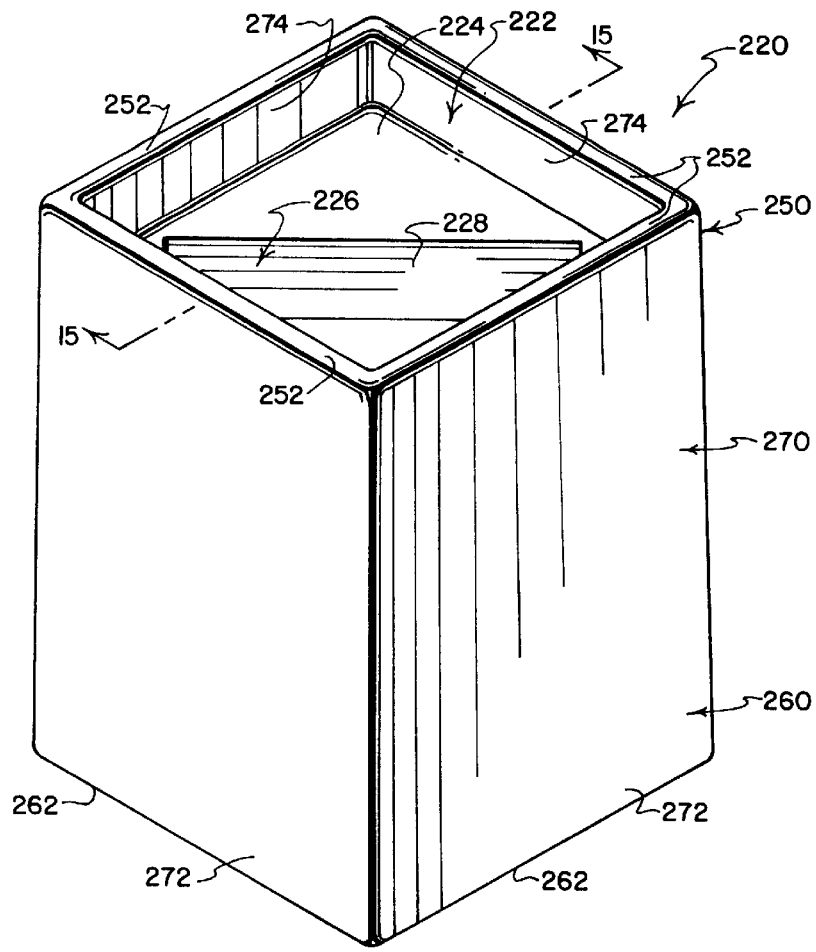
FIG. 7 is a perspective view of a second of the two blocks of FIG. 1.
Figures 8, 9:
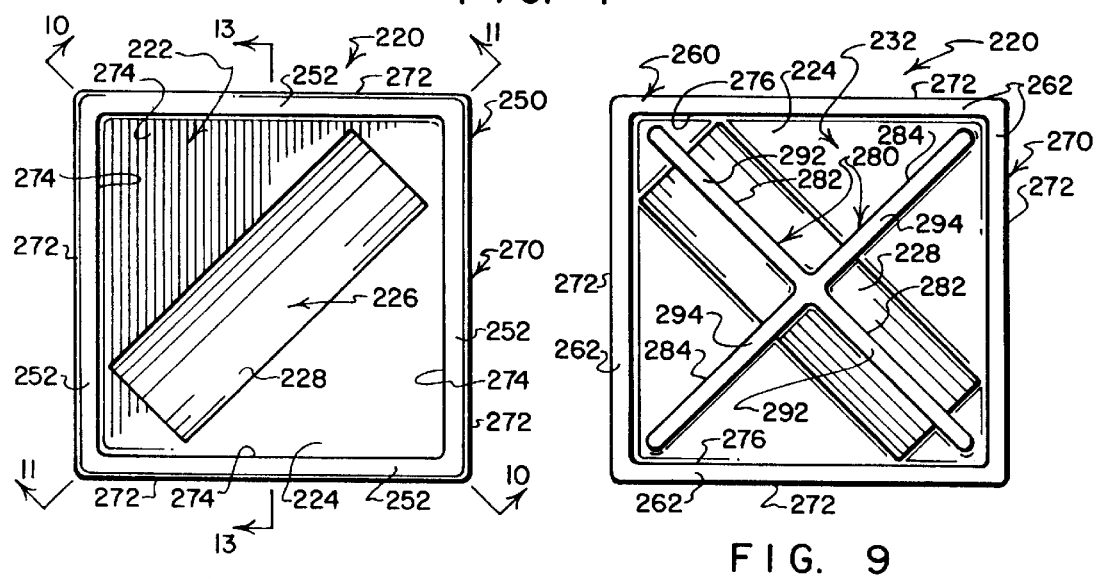
FIG. 8 is a top plan view thereof.
FIG. 9 is a bottom plan view thereof.

In FIGS. 7–11, features of the second block 220 are shown. Referring to FIG. 7, the second block 220 has an upper end region 250 and an opposite end region 260 that are connected by an upstanding side wall 270. A top surface 252 is defined by the upper end region 250. A bottom surface 262 is defined by the lower end region 260. The upstanding side wall 270 has an exterior surface 272 that extends the full distance between and connects the top and bottom surfaces 252, 262.

Figure 10:
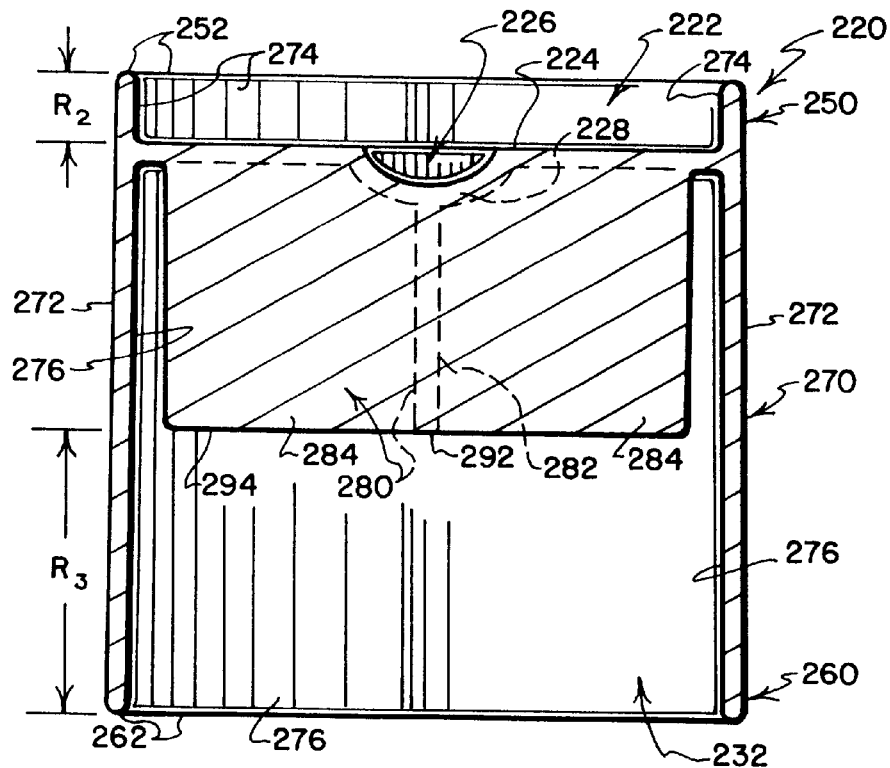
FIGS. 10 and 11 are sectional views as seen from planes indicated by the lines 10—10 and 11—11 in FIG. 8.

Referring to FIGS. 7, 8, 10 and 11, the recess 222 of the second block 220 is defined by a bottom wall 224 that parallels the planes of the top and bottom surfaces 252, 262, and by an upper interior surface 274 of the upstanding side wall 270. The depth of the recess 222 (as indicated by the dimension $R_2$ in FIGS. 10 and 13) is defined by the distance between the plane of the bottom wall 224 and the plane of the top surface 252. Referring to FIGS. 9–10, a lower interior surface 276 of the upstanding side wall 270 extends from the bottom wall 224 to the bottom surface 262.

Figure 11:
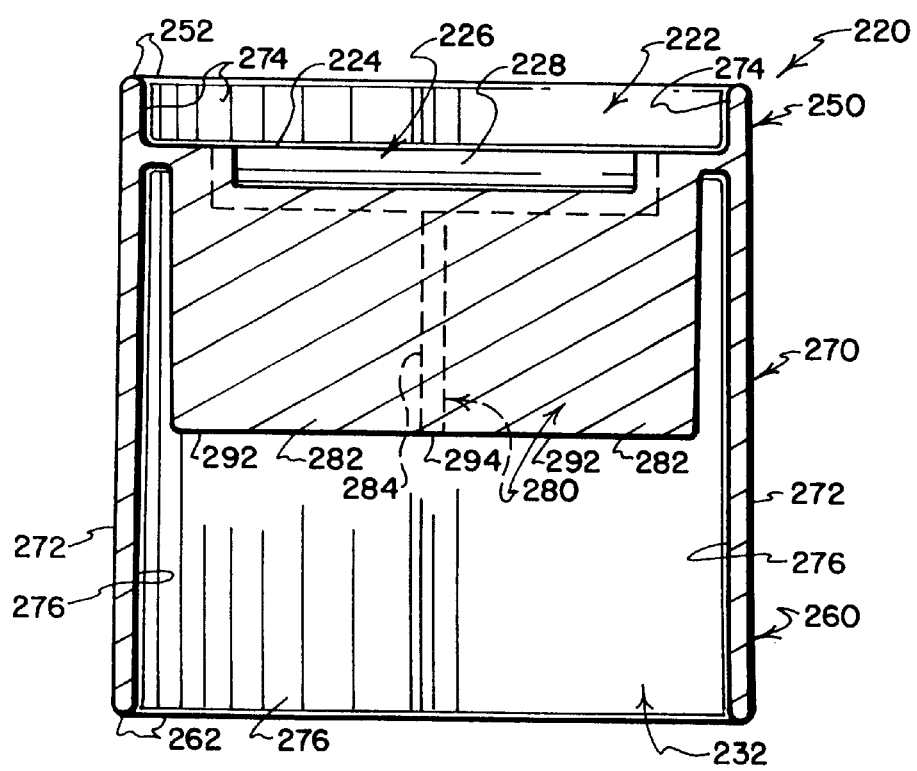

To strengthen and reinforce the bottom wall 224, an elongate, curved-bottom depression 226 is provided that opens upwardly into the recess 222, as is best seen in FIGS. 7, 8, 10 and 11. Referring to FIGS. 10 and 11, the depression 226 has a curved bottom wall 228 that depends into a space that is perimetrically surrounded by the lower interior surface 276 of the upstanding side wall 270. Also depending into the space surrounded by the interior surface 276 is a reinforcing rib structure 280 that has ribs 282, 284 that intersect to define an X-shape, as is best seen in FIG. 9. The ribs 282, 284 extend at right angles to each other and intersect mid-way along their lengths. Referring to FIGS. 9–11, upper portions of the rib 282 underlie and join with the bottom wall 228 of the depression 226. Upper portions of the rib 284 underlie and join with portions of the bottom walls 224, 228. Bottom portions of the ribs 282, 284 have bottom surfaces 292, 94 that extend in a plane that parallels the planes of the top and bottom surfaces 252, 262. The depth of the recess 232 (as indicated by the dimension $R_3$ in FIGS. 10 and 14) is defined by the distance between the plane of the bottom surfaces 292, 294 and the plane of the bottom surface 262.

Referring to FIG. 12, the dimension X refers to the total height or length of the first block 120; and, the dimension $H_1$ refers to the height at which the bed leg 110 is supported above the floor surface 200 when seated in the first recess 122. Referring to FIG. 13, the dimension Y refers to the total height or length of the second block 220; and, the dimension $H_2$ refers to the height at which the bed leg 110 is supported above the floor surface 200 when seated in the second recess 222. Referring to FIG. 14, the dimension $H_3$ refers to the height at which the bed leg 110 is supported above the floor surface 200 when seated in the third recess 232. Referring to FIG. 15, the sum of the dimensions $H_1$ and $H_2$ indicates the height at which the bed leg 110 is supported above the floor surface 200 when seated in the second recess 222 when the blocks 120, 220 are stacked with both of the blocks 120, 220 upright. Referring to FIG. 16, the sum of the dimensions $H_1$ and $H_3$ indicates the height at which the bed leg 110 is supported above the floor surface 200 when seated in the third recess 232 when the blocks 120, 220 are stacked with the first block 120 upright and the second block 220 inverted.

The fact that a total of five meaningfully different bed leg elevation heights can be provided within a desired range of between about one inch and about seven inches is best illustrated by means of an example. Referring to FIG. 12, assume: 1) that the full height of the first block 120, as indicated by the dimension X, is 2⅜"; 2) that a shallow depth of ⅝" inch is selected for the recess 122 (i.e., the dimension $R_1$), which means that using the recess 122 to support the bed leg 110 in the manner depicted in FIG. 12 will provide a bed leg elevation height $H_1$ of 1¾" (obtained by subtracting ⅝" from 2⅜") Referring to FIG. 13, assume: 1) that the full height of the second block 1220, as indicated by the dimension Y, is 4⅜"; 2) that a shallow depth of ⅝" is selected for the recess 222 (i.e., the dimension $R_2$), which means that utilizing the recess 222 to support the bed leg 110 in the manner depicted in FIG. 13 will provide a bed leg elevation height $H_2$ of 3¾" (obtained by subtracting ⅝" from 4⅜"); and, 3) that a relatively deep depth of 1⅞" is selected for the recess 232 (i.e., the dimension $R_3$), which means that using the recess 232 to support the bed leg 110 in the manner depicted in FIG. 14 will provide a bed leg elevation height "$H_3$" of 2½" (obtained by subtracting 1⅞" from 4⅜").

Utilizing the dimensions given above, the following bed leg elevation heights are provided by arranging the blocks 120, 220 in the five different ways that are depicted in FIGS. 12–16:

| Leg Elevation Dimensions & Heights | | | Shown in FIGURES |
|---|---|---|---|
| $H_1$ | = | 1¾" | FIG. 12 |
| $H_3$ | = | 2½" | FIG. 14 |
| $H_2$ | = | 3¾" | FIG. 13 |
| $H_1 + H_3$ | = | 4¼" | FIG. 16 |
| $H_1 + H_2$ | = | 5½" | FIG. 15 |

Figure 19:
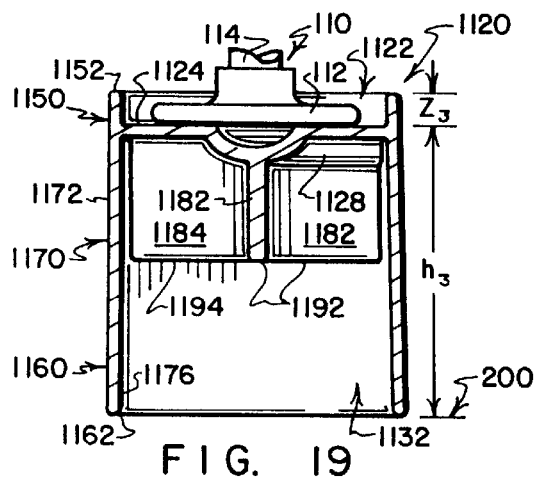
FIG. 19 is a sectional view similar to FIG. 17 but on a diminished scale, showing the first alternate block supporting the bed leg at one height atop a floor surface.
Figure 20:
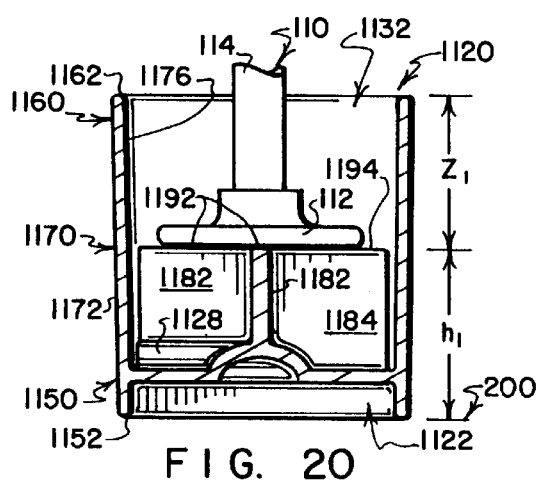
FIG. 20 is a sectional view similar to FIG. 19 but showing the first alternate block in an inverted orientation supporting the bed leg at another height atop a floor surface.
Figure 23:
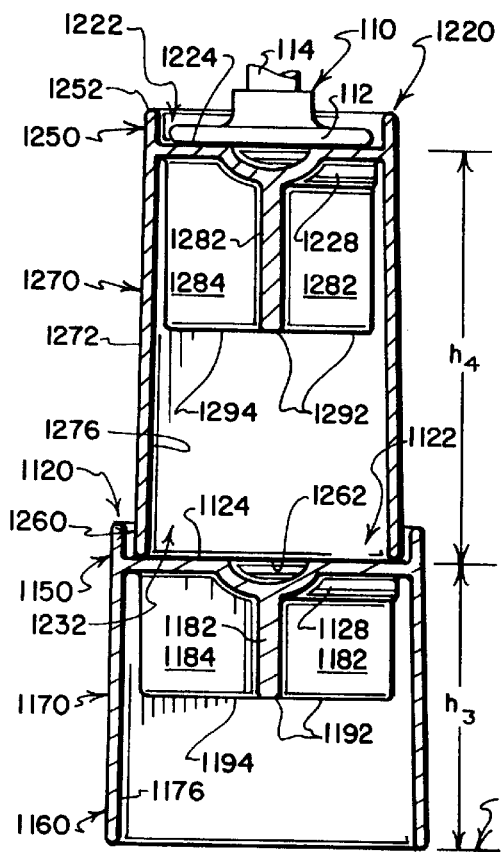
FIG. 23 is a sectional view showing the first and second alternate blocks stacked in a first of four possible relationships supporting the bed leg at another height above the floor surface.
Figure 24:
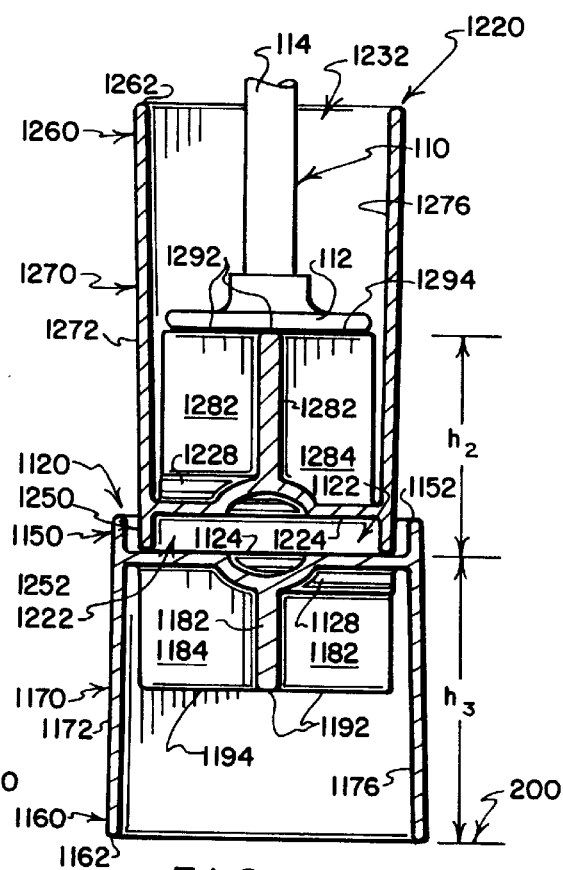
FIG. 24 is a sectional view showing the first and second alternate blocks stacked in a second of four possible relationships supporting the bed leg at another height above the floor surface.
Figure 25:
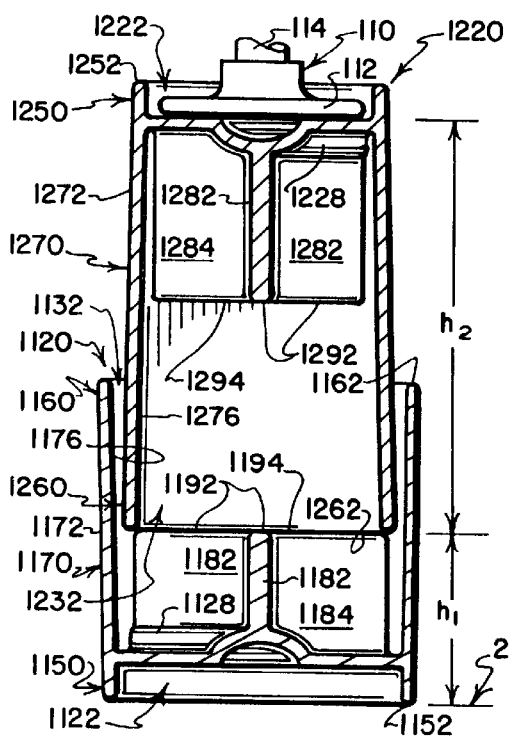
FIG. 25 is a sectional view showing the first and second alternate blocks stacked in a third of four possible relationships supporting the bed leg at another height above the floor surface; and, FIG. 26 is a sectional view showing the first and second alternate blocks stacked in a fourth of four possible relationships supporting the bed leg at another height above the floor surface.
Figure 26:
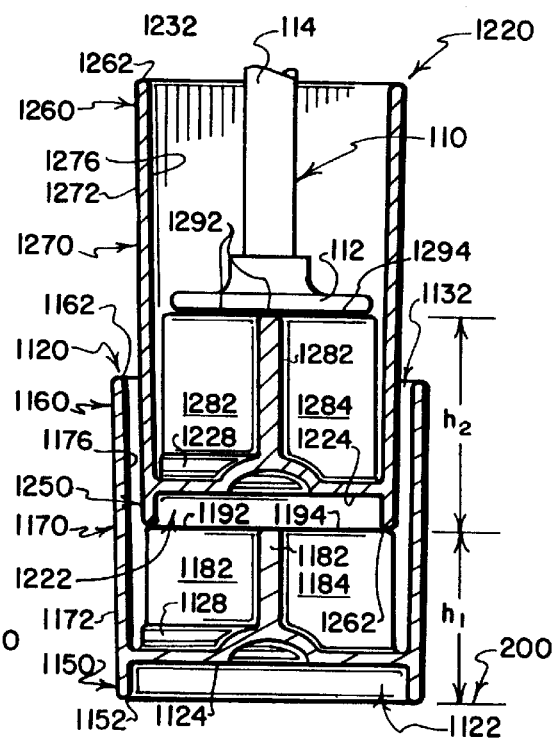

In FIGS. 17, 19, 23 and 24, an upright position (or upright orientation) of the first alternate block 1120 is depicted; and, in FIGS. 20, 25 and 26, an inverted position (or inverted orientation) of the alternate first block 1120 is shown. In FIGS. 18, 21, 23 and 25, an upright position (or upright orientation) of the second alternate block 1220 is depicted; and, in FIGS. 22, 24 and 26, an inverted position (or inverted orientation) of the alternate second block 1220 is shown. When upright, upper end regions 1150, 1250 of the alternate first and second blocks 1120, 1220 define upwardly facing recesses 1122, 1222 that are relatively shallow. When inverted, opposite end regions 1160, 1260 of the alternate first and second blocks 1120, 1220 define upwardly facing recesses 1132, 1232 that are relatively deep.

Because the alternate first block 1120 has many features that correspond in structure, arrangement and use to already described features of the first block 120, the description of features of the alternate first block 1120 can be held to a minimum by utilizing corresponding numerals to designate corresponding features of the alternate first block 1120 and the first block 120. Therefore, in the description that follows, features of the alternate first block 1120 that correspond to features of the first block 120 are indicated by numerals that differ by a magnitude of one thousand. For example, the alternate first block 1120 has a recess 1122 that corresponds to the recess 122 of the first block 120.

Likewise, because the alternate second block 1220 has many features that correspond in structure, arrangement and use to already described features of the second block 220, the description of features of the alternate second block 1220 can be held to a minimum by utilizing corresponding numerals to designate corresponding features of the alternate second block and the second block. Therefore, in the description that follows, features of the alternate second block 1220 that correspond to features of the second block 220 are indicated by numerals that differ by a magnitude of one thousand. For example, the alternate second block 1220 has recesses 1222, 1232 that correspond to the recesses 222, 232 of the second block 220.

The principal difference between the alternate blocks 1120, 1220 and the blocks 120, 220 is that the alternate first block 1120 has a sidewall bottom surface 1162 that does not extend in the same plane as the bottom surfaces 1192, 1194 of the ribs 1182, 1184—whereby the alternate first block 1120 defines a recess 1132 that finds no counterpart in the first block 120 inasmuch as the sidewall bottom surface 162 of the first block 120 extends in the same plane as the bottom surfaces 192, 194 of the ribs 182, 184. Referring to FIGS. 17 and 20, the depth of the recess 1132 is defined by the distance between the plane of the bottom surfaces 1192, 1194 of the ribs 1182, 1184 and the plane of the bottom surface 1162 of the sidewall 1170, as indicated in FIG. 20 by the dimension $Z_1$.

In FIG. 17, features of the alternate first block 1120 are shown. The alternate first block 1120 has an upper end region 1150 and an opposite end region 1160 that are connected by an upstanding side wall 1170. A top surface 1152 is defined by the upper end region 1150. A bottom surface 1162 is defined by the lower end region 1160. The upstanding side wall 1170 has an exterior surface 1172 that extends the full distance between and connects the top and bottom surfaces 1152, 1162.

The recess 1122 of the first block 1120 is defined by a bottom wall 1124 that parallels the planes of the top and bottom surfaces 1152, 1162, and by an upper interior surface 1174 of the upstanding side wall 1170. The depth of the recess 1122 (as indicated by the dimension $Z_3$ in FIGS. 17 and 19) is defined by the distance between the plane of the bottom wall 1124 and the plane of the top surface 1152. A lower interior surface 1176 of the upstanding side wall 1170 extends from the bottom wall 1124 to the bottom surface 1162.

To strengthen and reinforce the bottom wall 1124, an elongate, curved-bottom depression 1126 is provided that opens upwardly into the recess 1122. The depression 1126 has a curved bottom wall 1128 that depends into a space that is perimetrically surrounded by the lower interior surface 1176 of the upstanding side wall 1170. Also depending into the space surrounded by the interior surface 1176 is a reinforcing rib structure 1180 that has ribs 1182, 1184 that intersect to define an X-shape. The ribs 1182, 1184 extend at right angles to each other and intersect mid-way along their lengths. Upper portions of the rib 1182 underlie and join with the bottom wall 1128 of the depression 1126. Upper portions of the rib 1184 underlie and join with portions of the bottom walls 1124, 1128. Bottom portions of the ribs 1182, 1184 have bottom surfaces 1192, 1194 that parallel but are spaced from the plane of the bottom surface 1162 of the sidewall 1170. The distance between the plane of the bottom surfaces 1192, 1194 and the plane of the bottom surface 1162 defines the depth of the recess 1132, as indicated in FIGS. 17 and 20 by the dimension $Z_1$.

In FIG. 18, features of the alternate second block 1220 are shown. The alternate the second block 1220 has an upper end region 1250 and an opposite end region 1260 that are connected by an upstanding side wall 1270. A top surface 1252 is defined by the upper end region 1250. A bottom surface 1262 is defined by the lower end region 1260. The upstanding side wall 1270 has an exterior surface 1272 that extends the full distance between and connects the top and bottom surfaces 1252, 1262.

The recess 1222 of the second block 1220 is defined by a bottom wall 1224 that parallels the planes of the top and bottom surfaces 1252, 1262, and by an upper interior surface 1274 of the upstanding side wall 1270. The depth of the recess 1222 (as indicated by the dimension $Z_4$ in FIGS. 17 and 21) is defined by the distance between the plane of the bottom wall 1224 and the plane of the top surface 1252. A lower interior surface 1276 of the upstanding side wall 1270 extends from the bottom wall 1224 to the bottom surface 1262.

To strengthen and reinforce the bottom wall 1224, an elongate, curved-bottom depression 1226 is provided that opens upwardly into the recess 1222. The depression 1226 has a curved bottom wall 1228 that depends into a space that is perimetrically surrounded by the lower interior surface 1276 of the upstanding side wall 1270. Also depending into the space surrounded by the interior surface 1276 is a reinforcing rib structure 1280 that has ribs 1282, 1284 that intersect to define an X-shape. The ribs 1282, 1284 extend at right angles to each other and intersect mid-way along their lengths. Upper portions of the rib 1282 underlie and join with the bottom wall 1228 of the depression 1226. Upper portions of the rib 1284 underlie and join with portions of the bottom walls 1224, 1228. Bottom portions of the ribs 1282, 1284 have bottom surfaces 1292, 1294 that extend in a plane that parallels the planes of the top and bottom surfaces 1252, 1262. The depth of the recess 1232 (as indicated by the dimension $Z_2$ in FIGS. 18 and 22) is defined by the distance between the plane of the bottom surfaces 1292, 1294 and the plane of the bottom surface 1262.

Four ways in which the alternate first and second blocks 1120, 1220 may be utilized, by themselves, in upright and inverted positions, to provide four different bed leg elevation heights is depicted in FIGS. 19–22. Four ways in which the alternate first and second blocks 120, 1220 may be utilized in stacked combination to provide four additional bed leg elevation heights is shown in FIGS. 23–26.

The fact that a total of eight meaningfully different bed leg elevation heights can be provided within a desired range of between about one inch and about seven inches is best illustrated by means of an example. Referring to FIG. 17, assume: 1) that the full height of the alternate first block 1120, as indicated by the dimension A is 3⅜"; 2) that a shallow depth of ⅝" inch is selected for the recess 1122 (i.e., the dimension $Z_3$), which means that using the recess 1122 to support the bed leg 110 in the manner depicted in FIG. 19 will provide a bed leg elevation height $h_3$ of 2¾" (obtained by subtracting ⅝" from 3⅜"); and, 3) that a relatively deep recess depth of 1¾" is selected for the recess 1132 (i.e, the dimension $Z_1$) which means that using the recess 1132 to support the bed leg 110 in the manner depicted in FIG. 20 will provide a bed leg elevation height $h_1$ of 1⅝" (obtained by subtracting 1¾" from 3⅜"). Referring to FIG. 18, assume: 1) that the full height of the alternate second block 1220, as indicated by the dimension B is 4⅝"; 2) that a shallow depth of ⅝" is selected for the recess 1222 (i.e., the dimension $Z_4$), which means that utilizing the recess 1222 to support the bed leg 110 in the manner depicted in FIG. 21 will provide a bed leg elevation height $h_4$ of 4" (obtained by subtracting ⅝" from 4⅝"); and, 3) that a relatively deep recess depth of 2½" is selected for the recess 1232 (i.e., the dimension $Z_2$), which means that using the recess 1232 to support the bed leg 110 in the manner depicted in FIG. 22 will provide a bed leg elevation height $h_2$ of 2⅛" (obtained by subtracting 2½" from 4⅝").

Figure 21:
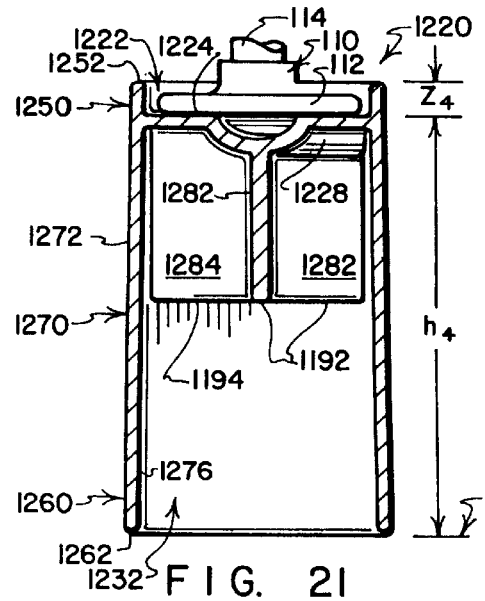
FIG. 21 is a sectional view similar to FIG. 18 but on a diminished scale, showing the second alternate block in one orientation supporting the bed leg at another height above the floor surface.
Figure 22:
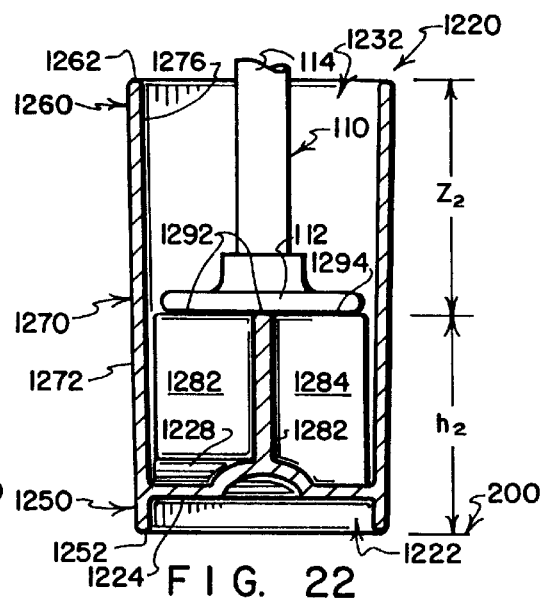
FIG. 22 is a sectional view similar to FIG. 21 but showing the second alternate block in an inverted orientation supporting the bed leg at yet another height above the floor surface.

Utilizing the dimensions given above, the following bed leg elevation heights are provided by arranging the blocks 1120, 1220 in the eight different ways that are depicted in FIGS. 19–26:

| Leg Elevation Dimensions & Heights | | | Shown in FIGURES |
|---|---|---|---|
| $h_1$ | = | 1⅝" | FIG. 20 |
| $h_2$ | = | 2⅛" | FIG. 22 |
| $h_3$ | = | 2¾" | FIG. 19 |
| $h_1 + h_2$ | = | 3¾" | FIG. 26 |
| $h_4$ | = | 4" | FIG. 21 |
| $h_3 + h_2$ | = | 4⅞" | FIG. 24 |
| $h_1 + h_4$ | = | 5⅝" | FIG. 25 |
| $h_3 + h_4$ | = | 6¾" | FIG. 23 |

What FIGS. 12–16 illustrate is that as many as five different bed leg elevation heights may be provided by utilizing two different length, different size blocks singly and in stacked combination if one of the blocks, when upright and inverted, functions to support the bed leg at different heights. What FIGS. 19–26 illustrate is that as many as eight different bed leg elevation heights may be provided by utilizing two different length, different size blocks singly and in stacked combination if both of the blocks, when upright and inverted, function to support the bed leg at different heights. Achieving this degree of versatility by utilizing a simple pair of one-piece blocks represents one of the novel features of the invention Utilizing a stackable, nestable pair of blocks including at least one block having different depth recesses in opposed end regions for providing bed leg support at different heights when upright and inverted represents another novel aspect of the invention.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A pair of stackable blocks, each being of one-piece construction, including a first block structure having means for supporting a bed leg at a first height above a floor surface when positioned atop the floor surface in an upright orientation, and a second block structure having means for supporting the bed leg at a second height above the floor surface when positioned atop the floor surface in an upright orientation, with at least one of the first and second block structures also having means for supporting the bed leg at another height when positioned atop the floor surface in an inverted orientation, with the first and second block structures also being stackable one atop another while in selected ones of said upright and inverted orientations for supporting the bed leg at at least one additional height above the floor surface, and, with the first, second, another, and additional heights differing from each other, thereby providing a selection of bed leg elevation heights within a desired range of bed leg elevation heights.

2. The pair of stackable blocks of claim 1 wherein the first and second block structures are stackable one block structure atop the other block structure in a plurality of combinations that include one stacked combination wherein least a selected one of the first and second block structures is in said upright orientation, and at least another stacked combination wherein the selected one of the first and second block means is in said inverted orientation, with said one and another combinations being operable to provide bed leg support at still other heights that reside within said range.

3. The pair of stackable blocks of claim 1 additionally including positioning structure defined by at least one of the first and second block structures for assisting to align the first and second block structures when the first and second block structures are stacked one atop another.

4. The pair of stackable blocks of claim 1 wherein at least a chosen one of the first and second block structures defines recess means for receiving therein portions of another of the first and second block structures when the first and second block structures are stacked one atop another.

5. The pair of stackable blocks of claim 4 wherein the chosen one of the first and second block structures has top and bottom surfaces that extend in substantially parallel planes, and wherein the recess means is defined, in part, by a bottom wall that extends in a bottom wall plane that is spaced between the parallel planes and extends substantially parallel thereto.

6. The pair of stackable blocks of claim 5 wherein the said bottom wall plane is closer to one of the top and bottom parallel surface planes than to the other of the top and bottom parallel surface planes, and the said bottom wall is reinforced by a formation that extends away from the bottom wall plane toward the other of the said parallel planes.

7. A pair of stackable blocks for being used individually and in stacked combination to support a bed leg at a selection of heights above a floor surface, comprising, first and second blocks, each being of one-piece construction and each having opposed end regions, with at least three of the end regions defining recesses therein that are configured to receive and support the bed leg therein when facing upwardly, with at least one of the recesses of at least a selected one of the blocks being of sufficient size to receive and support therein the opposed end regions of another of the blocks when the blocks are positioned in stacked combination with one block atop another block to position a selected one of the said recesses of said other of the blocks facing upwardly to receive and support the bed leg therein, and, with the blocks having heights and the recesses having depths that are selected to enable the blocks, when used singly and in stacked combination, to support the bed leg at a selection of different heights above a floor surface.

8. The pair of stackable blocks of claim 7 wherein each of the blocks has recesses of different depths formed in the opposite end regions thereof, and both of the recesses of the selected one of the blocks are of sufficient size to receive and support therein the opposed end regions of the other of the blocks when the blocks ant positioned in stacked combination.

9. The pair of stackable blocks of claim 8 wherein:
   a) the selected one of the blocks has opposed end surfaces connected by an upstanding side wall, with the opposed end surfaces extending in spaced planes that are substantially parallel;
   b) the upstanding side wall surrounds the recesses of different depths that are formed in the opposite end regions of the selected one of the blocks;
   c) a chosen one of the recesses of the selected one of the blocks is defined, at least in part, by a bottom wall that extends in a plane spaced between and substantially paralleling the spaced planes of the opposed end surfaces; and,
   d) the other of the recesses of the selected one of the blocks is defined, at least in part, by rib formation means connected to and projecting away from the bottom wall.

10. A pair of stackable blocks for being used individually and in stacked combination to support a bed leg at a selection of heights above a floor surface, comprising:
   a) a first one-piece block structure positionable atop a floor surface in an upstanding position, with said block structure having means for defining an associated first support surface for supporting a bed leg at a first height above the floor surface;
   b) a second one-piece block structure positionable atop a floor surface in an upstanding position, with said second block structure having means for defining an associated second support surface for supporting the bed leg at a second height above the floor surface, and for being supported in stacked combination atop said first support surface of the first block structure to position the second support surface to support the bed leg at a third height above the floor surface;
   c) with a selected one of the first and second block structures also defining an additional support surface for supporting the bed leg at a fourth height above the floor surface when the selected block structure is positioned, inverted, atop the floor surface; and, d) wherein the said first, second, third, and fourth heights differ from each other to provide a selection of bed leg elevation heights within a desired range of bed leg elevation heights.

11. The pair of stackable blocks of claim 10 additionally including positioning structure defined by at least one of the first and second block structures for assisting to maintain a stacked combination relationship of the first and second block structures when one selected block structure is supported in stacked relationship atop another of the first and second block structures.

12. The pair of stackable blocks of claim 10 wherein the said first support surface is located at a base of a first recess defined by the first block structure, the said second support surface is located at a base of a second recess defined by one end region of the second block structure, the additional support surface is located within a third recess defined by an opposite end region of the second block structure, and wherein the first recess is of sufficient size to permit the said one end region and the said opposite end region of the second block structure to be received one at a time therein, and each of the first, second, and third recesses is of sufficient size to permit the bed leg to be received therein.

13. The pair of stackable blocks of claim 10 wherein the selected block structure also is capable of being supported in stacked combination, inverted, atop the associated support surface of another of the first and second block structures for supporting the bed leg at a fifth height above the floor surface, and wherein the fifth height differs from the first, second, third and fourth heights to thereby enhance the selection of bed leg elevation heights within said range.

14. The pair of stackable blocks of claim 13 additionally including a recess formation defined by at least one of the first and second block structures for receiving portions of the other of the first and second block structures to assist in maintaining a stacked combination relationship of the first and second block structures when the first and second block structures are in said stacked combination.

15. A pair of stackable blocks for being used individually and in stacked combination to support a bed leg at a selection of at least five different heights above a floor surface, comprising:
   a) a first one-piece block that can be positioned atop a floor surface in an upright position, wherein the first block has a first side wall formation for extending substantially vertically to connect opposed end regions of the first block, with one of the opposed end regions of the first block being configured to define a first upwardly facing recess when the first block is in the upright position, with the first upwardly facing recess being configured to receive and support a bed leg at a first height above the floor surface when the first block is positioned atop the floor surface in the upright position;
   b) a second one-piece block that can be positioned atop the floor surface in an upright position and in an inverted position, wherein the second block has a second side wall formation for extending substantially vertically to connect opposed end regions of the second block, with one of the opposed end regions of the second block being configured to define a second upwardly facing recess when the second block is in the upright position, and with the other of the opposed end regions of the second block being configured to define a third upwardly facing recess when the second block is in the inverted position, with the second upwardly facing recess being configured to receive and support the bed leg at a second height above the floor surface when the second block is positioned atop the floor surface in the upright position, and with the third upwardly facing recess being configured to receive and support the bed leg at a third height above the floor surface when the second block is positioned atop the floor surface in the inverted position;
   c) with the second block being stackable and nestable atop the first block because the first recess is configured to selectively receive therein the opposed end regions of the second block to selectively support the second block atop the floor surface in a raised upright position and in a raised inverted position, with the raised upright position of the stacked first and second blocks being capable of receiving the bed leg within the second recess and of supporting the bed leg at a fourth height above the floor surface, and with the raised inverted position of the stacked first and second blocks being capable of receiving the bed leg within the third recess and of supporting the bed leg at a fifth height above the floor surface;

d) wherein said recesses are positioned along the length of the first and second blocks to cause the first, second, third, fourth and fifth to heights to differ from each other to provide a selection of bed leg elevation heights within a desired range of bed leg elevation heights.

16. The pair of stackable blocks of claim 15 wherein at least three of the first, second, third, fourth, and fifth heights are chosen to provide a selection of significantly different bed leg support heights that are within a height range of substantially one inch to substantially seven inches.

17. The pair of stackable blocks of claim 15 wherein the second recess is defined, at least in part, by a bottom wall that is engaged by the bed leg when the second recess receives and supports the bed leg, and the third recess is defined, at least in part, by a formation that extends away from the bottom wall and is engaged by the bed leg when the third recess receives and supports the bed leg.

18. The pair of stackable blocks of claim 17 wherein the second one-piece block includes an upstanding side wall that surrounds the second and third recesses, and wherein the formation that extends away from the bottom wall is an X-shaped structure that also is surrounded by the upstanding side wall.

19. A pair of stackable blocks for supporting a bed leg at a selection of heights above a floor surface, comprising:

a) a first one-piece block that can be positioned atop a floor surface in an upright position and that can be positioned atop the floor surface inverted, wherein the first block has a first side wall formation for extending substantially vertically to connect opposed end regions of the first block, with one of the opposed end regions of the first block being configured to define a first upwardly facing recess when the first block is in the upright position, with the first upwardly facing recess being configured to receive and support a bed leg at a first height above the floor surface when the first block is positioned atop the floor surface in the upright position;

b) a second one-piece block that can be positioned atop the floor surface in an upright position and that can be positioned atop the floor surface inverted, wherein the second block has a second side wall formation for extending substantially vertically to connect opposed end regions of the second block, with one of the opposed end regions of the second block being configured to define a second upwardly facing recess when the second block is in the upright position, with the second upwardly facing recess being configured to receive and support the bed leg at a second height above the floor surface when the second block is positioned atop the floor surface in the upright position;

c) with the first recess being configured to receive therein at least one of the opposed end regions of the second block for supporting the second block stacked and nested atop the first block, with the second recess facing upwardly for receiving the bed leg therein and for supporting the bed leg at a third height above the floor surface;

d) with the other of the opposed end regions of at least a selected one of the first and second blocks being configured, when inverted, to receive and support the bed leg at a fourth height above the floor surface; and, e) wherein the first, second, third and fourth heights differ from each other to provide a selection of bed leg elevation heights within a desired range of bed leg elevation heights.

20. The pair of stackable blocks of claim 19 wherein the first, second, third and fourth heights are chosen to provide a selection of significantly different bed leg support heights that are within a height range of substantially one inch to substantially seven inches.

* * * * *